United States Patent [19]

Felton

[11] Patent Number: 5,244,062
[45] Date of Patent: Sep. 14, 1993

[54] WHEEL AND BRAKE DEVICE FOR MEANS OF TRANSPORTATION

[75] Inventor: Tom Felton, Skjern, Denmark

[73] Assignee: Scantrolley ApS, Lem St., Denmark

[21] Appl. No.: 768,627

[22] PCT Filed: Apr. 18, 1990

[86] PCT No.: PCT/DK90/00102
§ 371 Date: Oct. 18, 1991
§ 102(e) Date: Oct. 18, 1991

[87] PCT Pub. No.: WO90/12721
PCT Pub. Date: Nov. 1, 1990

[30] Foreign Application Priority Data

Apr. 27, 1989 [DK] Denmark ............................ 2033/89

[51] Int. Cl.⁵ ............................................. B60B 33/00
[52] U.S. Cl. ................................ 188/1.12; 16/35 R;
188/21; 188/31; 188/69; 188/74
[58] Field of Search ................. 188/1.12, 19, 21, 29,
188/31, 69, 74; 16/35 R

[56] References Cited

U.S. PATENT DOCUMENTS

| | | | |
|---|---|---|---|
| 2,684,734 | 7/1954 | Wilson | 16/35 R |
| 3,298,467 | 1/1967 | Darnell | 188/29 |
| 3,571,842 | 3/1971 | Fricke | 16/35 R |
| 4,479,566 | 10/1984 | Ishii | 188/69 X |
| 4,526,253 | 7/1985 | Schmidt | 188/74 X |
| 4,997,066 | 3/1991 | Tsigo | 188/69 X |

FOREIGN PATENT DOCUMENTS

| | | | |
|---|---|---|---|
| 2239339 | 3/1973 | Fed. Rep. of Germany | 16/35 R |
| 2262423 | 7/1973 | Fed. Rep. of Germany | 188/31 |
| 2308094 | 8/1974 | Fed. Rep. of Germany | 16/35 R |
| 3130100 | 11/1983 | Fed. Rep. of Germany | . |

Primary Examiner—George E. A. Halvosa
Attorney, Agent, or Firm—Watson, Cole, Grindle & Watson

[57] ABSTRACT

In a wheel and brake device for a transportation vehicle with pivotal wheels, a particularly simple brake operation may be achieved by placing a brake activating structure at each end of the vehicle and connecting it to a brake lever. The device comprises only one pedal at opposite ends. The pedals are arranged to be activated in only one direction irrespective of whether a braking or a releasing operation is to be performed. Each pedal is connected to a swinglebar by brake levers, the swinglebar also being connected to a cam follower. The cam follower runs along a cam track defining two fixed resting positions for the cam follower. In one of the resting positions, tabs on a brake block will engage with teeth firmly connected to the wheels.

9 Claims, 7 Drawing Sheets

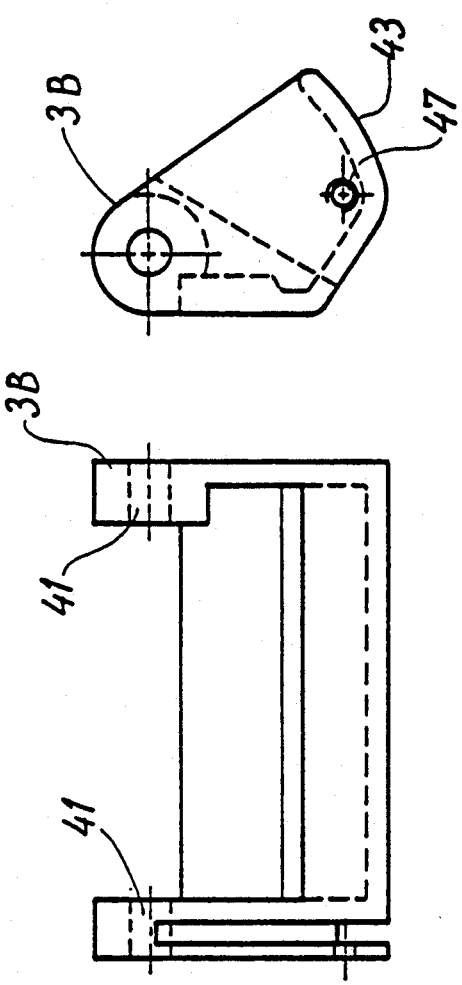

WHEEL AND BRAKE DEVICE FOR MEANS OF TRANSPORTATION

BACKGROUND OF THE INVENTION

The present invention relates to a wheel and brake device for a means of transportation, preferably a transport trolley, where at least one wheel is pivotally supported and where the brake device includes at least one brake activating means at the front and/or rear end of the means of transportation, the activating means being activatable and deactivatable by activating in one direction only, a cam mechanism defining two fixed resting positions for an activated brake and for a deactivated brake, respectively, and at least one brake lever connecting the brake activating means to a brake block intended for engagement with teeth on at least one wheel.

Such devices are known from various means of transportation, especially transport trolleys used in aircraft cabins. In such transportation trolleys at least the pairs of wheels at one end of the trolley are pivotally supported for the sake of trolley manoeuvrability. Such trolleys are provided with a brake device which should be able to brake the wheels even when the trolleys are heavily loaded and when the floor in the aircraft cabin is sloping, e.g., during take-off. Normally, the brake is activated by means of foot pedals located at each end of the trolley and which enables the establishment of an engagement between the brake block and the wheels.

U.S. Pat. No. 3,571,842 discloses a brake device of the type mentioned above. However, this device is associated with the disadvantage that the brake and the brake activating means are directly connected to a wheel. If the wheel can pivot, it becomes difficult to operate the brake activating means as in certain circumstances it may have moved underneath the means of transportation. Furthermore, its use is very troublesome as a brake activating means is required for each wheel to be braked. According to this patent, a friction engagement is established between the brake block and the wheel. This is disadvantageous as wear of the friction surfaces of the wheels and the brake block neccesitate a relatively frequent inspection and adjustment. This problem is solved by a brake device according to DE-A-3,130,100 wherein a mechanical engagement between the brake block and the teeth on the wheel of the trolley is illustrated. However, this device is complicated and demands a precise adjustment of the engagement portion of the brake block and the teeth.

Transportation trolleys are also known which at one and/or other end have a brake activating means acting on several wheels However, the brake device on the known trolleys is complex as, at each end, they comprise two foot pedals which by a downwardly orientated pressure both activate and deactivate the brake. Alternatively, one brake pedal only may be provided at each end which is activated and deactivated by a downwardly orientated pressure and an upwardly orientated pressure, respectively. However, this construction would be harmful to the shoes of the staff when they apply the upwardly directed pressure with the upper side of their shoe. In the known trolleys, an activating and a deactivating operation of the brake is effected from one end of the trolley. If a deactivation has to be effected from the opposite end of the trolley to the end where the activation is effected, a complex construction with doubling of several elements is required.

Even though the drawbacks associated with the known trolleys of the type mentioned above is explained with a view to transportation trolleys utilized in aircraft cabins, it is obvious that other means of transportation of a similar type as, e.g., fodder trucks for use in stables, waste containers, hospital beds, etc., suffer from the same or corresponding drawbacks. Therefore, the invention may advantageously be used in connection with various means of transportation.

It is the object of the present invention to remedy the above-mentioned drawbacks and to provide a device of the type mentioned in the preamble of the specification which is easy to operate and which requires little maintenance and adjustment and which also permits safe braking.

SUMMARY OF THE INVENTION

This object is achieved with a wheel and brake device which is characterized in that device comprises only one brake activating means at the one and/or at the other end of the means of transportation, that the brake lever is arranged so that the brake activating means is connected to the brake block on all the wheels to be braked, that the cam mechanism comprises a cam track and a cam follower of which one of the elements of the cam mechanism is firmly connected to the means of transportation while the other element is connected to the brake lever, that the wheels are constituted of twin wheels with teeth arranged on the opposing wheel rims, and that the brake block comprises two mutually independent resilient compliant tabs intended for engagement with each their respective set of teeth.

Hereby a device is achieved where the brake activating means by activation in one direction only, advantageously by depressing a foot pedal, alternately provides an activation and a deactivation of the brake on all of the wheels to be braked as the one resting position of the cam follower is so provided that the brake lever connected thereto sets the brake block of each wheel in an active position while the other resting position of the cam follower defines an inactive position for the brake block of each wheel. Thus the device is very easy to operate as the user needs only to apply a pressure on one brake activating means and only in one direction irrespective of a braking or a releasing operation of all the wheels to be braked is to be performed. Besides, an engagement between the brake block and the teeth of the wheels will establish a safe mechanical engagement as, due to their resilience, the tabs are urged into engagement with the teeth. Furthermore, in case of a break in one of the tabs there will be established a braking of the wheel by means of the other tab.

It should be noted that the brake block and the teeth can be formed in any convenient manner which makes it possible to establish a safe engagement, e.g., by tapering the elements intended for engagement with each other.

Furthermore, it is to be observed that activation of the brake activating means may be carried out using a manually-operated handle by electrical activation or in another way.

The described device may be used both for means of transportation where a braking of the wheels is established at one end only and in connection with means of transportation where a braking of the wheels is established at both ends. Furthermore, a suitable design of the brake lever will make it possible to activate and/or deactivate the brake from both the front and the rear ends of the means of transportation. Thus an alternate function is always achieved irrespective of a preceding operation of the brake having taken place from the opposite end. It is also possible to position the brake activating means at the sides of the means of transportation.

Furthermore, the brake block may optionally be arranged for connection to a fixed wheel or a pivotally supported wheel as the brake block is arranged in a fixed mutual position in relation to the teeth in order for it always to be able to engage with these.

The invention will now be described in further detail with reference to the accompanying drawings.

BRIEF DESCRIPTION OF THE DRAWINGS

FIGS. 8-11 shows a foot-operated two-piece brake pedal according to the invention.

DETAILED DESCRIPTION OF THE PREFERRED EMBODIMENT

Figure 1:
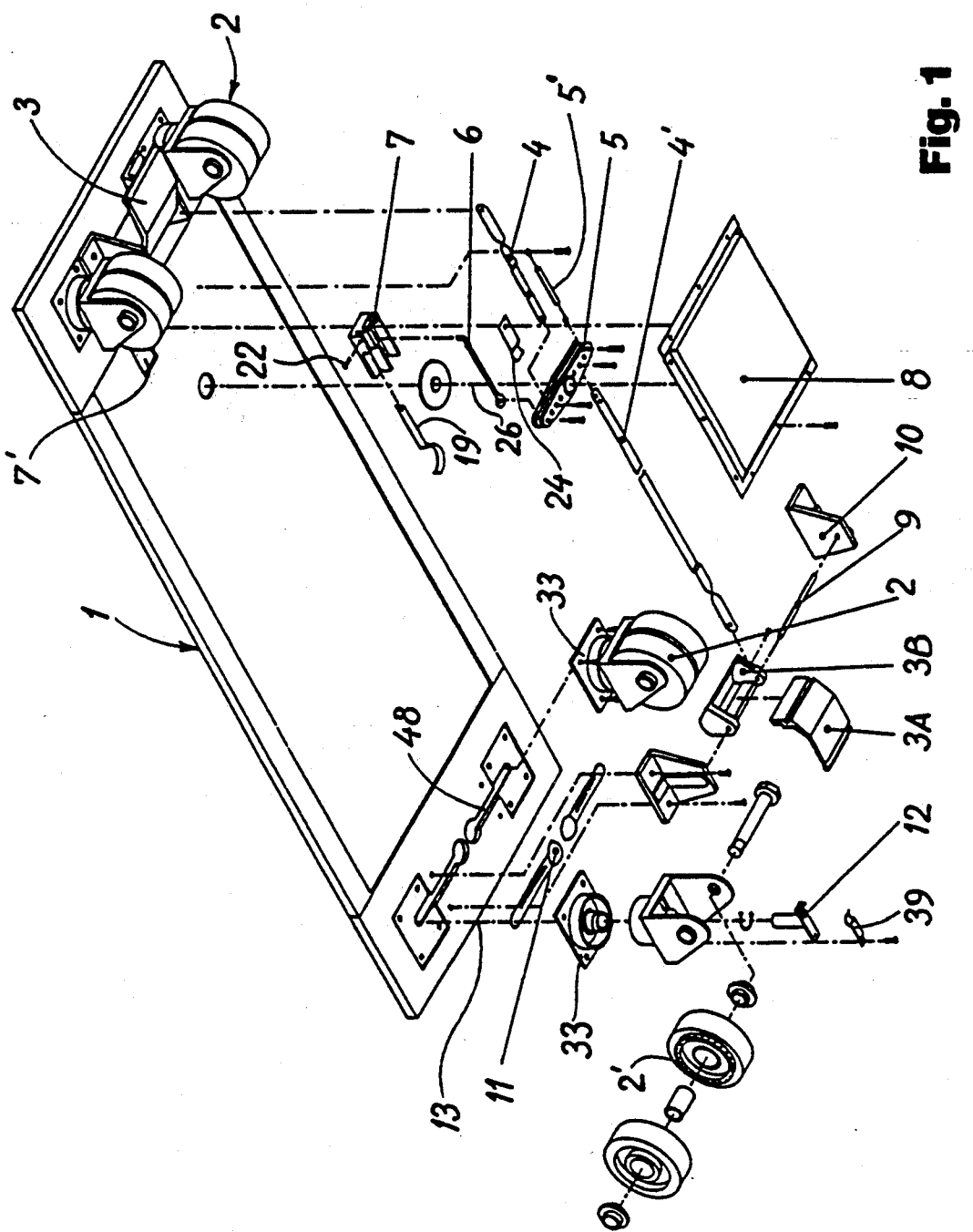
FIG. 1 shows an exploded perspective view of a wheel and brake device according to the invention.

FIG. 1 shows a support framework 1 for transportation trolley (not shown) for use in aircraft cabins. The support framework 1 is provided with four pivotal twin wheels 2. The wheels 2 are respectively positioned substantially in each corner of the support framework 1. The transportation trolley is arranged to be braked by means of a foot-operated brake pedal 3. The trolley may be operated from one end or the other end as a brake pedal 3 is arranged at both ends of the support framework. The brake pedal 3 is formed of two separate parts 3A, 3B which will be explained below. The brake pedal 3 is connected via a brake lever 4 to a swinglebar 5. The swinglebar 5 is connected to a further brake lever 4' in order to establish an interconnection between the brake pedals 3 at both ends of the trolley. The swinglebar 5 is pivotally connected to a cam follower 6 running in a cam track means 7 mounted on the underside of the support framework 1 to secure the correct function by activation of one of the brake pedals 3. The cam follower 6 is elaborated as a lever which at one end has a member which engages with the cam track and at the other end is pivotally connected with the swinglebar 5. As will be explained below, the brake pedals 3 operate exclusively by a downwardly directed pressure activation, both when an activation of the brake and when a deactivation of the brake is to be effected. The entire arrangement comprising the cam track means 7, cam follower 6 and the swinglebar 5 is covered by a protection plate 8 which is mounted to the support framework and which is provided with recesses to ensure a correct mutual positioning of the swinglebar, the brake levers, springs and which on one hand prevents mechanical damage and on the other hand prevents soiling. Thus the cam track means 7 is secured by a recess in the protection plate and a recess 7' in the support framework 1. Furthermore the swinglebar is pivotally supported about a pin which is integral with the protection plate.

The two elements 3A, 3B of the brake pedals 3 are mutally pivotally connected about a shaft 9 mounted in two brackets 10 secured between two wheels 2 at opposite ends of the support framework. The two-component brake pedal is hinged about the shaft 9 with the centre of gravity so placed that it always reverts to be free of the floor to avoid damage. The elements 3B of the brake pedals are connected to the swinglebar 5 via the brake levers 4,4'. Furthermore, the element 3B abuts one end of a lever arm 11. The other end of the lever arm 11 abuts a brake block 12 located substantially coaxially about the swivel axis 13 of the pivotal wheel. The brake block 12 is arranged to engage with teeth 2' positioned on opposing sides of the twin wheels. The brake arrangement makes it possible to brake all four wheels irrespective of which brake pedal 3 is activated. It is also possible to release all four wheels by activating any of the two brake pedals 3.

Figure 2:
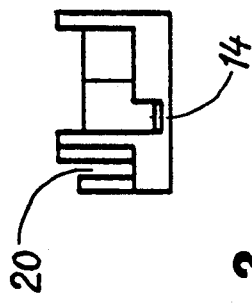
FIGS. 2-4 illustrate a cam track according to the invention.
Figure 3:
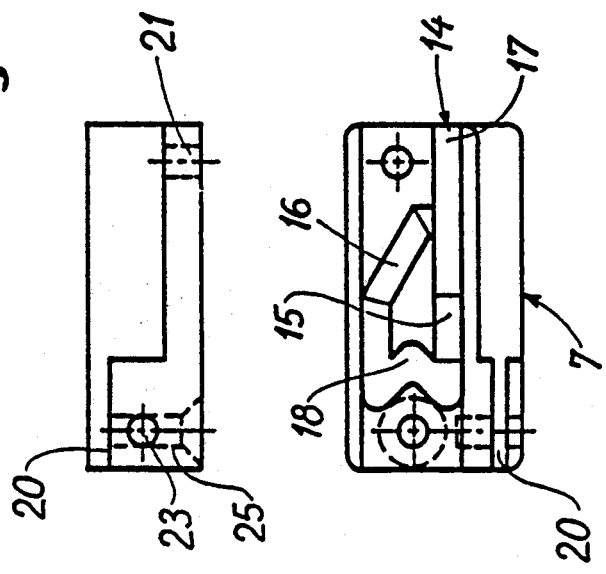
Figure 4:
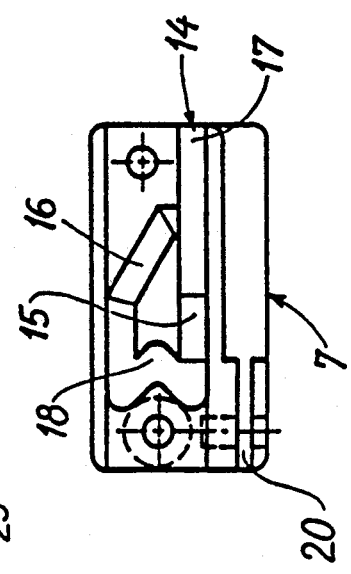

FIGS. 2, 3 and 4 illustrate the cam track means 7 having a cam track 14. The cam track 14 comprises an inclined surface 15 and an inclined surface 16, which surfaces as seen in the direction of the passage of the cam follower along the cam track, are both upwardly orientated, and which surfaces connect substantially plane parts of the bottom of the cam track at one resting position 17 and another resting position 18 in such a way that this will ensure an evenly rising course of the cam track bottom on to a breast which is located between the resting position 18 and the resting position 17 as seen in the direction of the passage of the cam follower along the cam track. A higher degree of security for the correct passage of the cam follower 6 along the cam track 2 is hereby achieved. Thus the cam track 14 provides two resting positions 17 and 18 for the cam follower 6. By activation of the brake pedal, the cam follower 6 starts its passage from the resting position 17 where the brake is deactivated, along the cam track across the inclined surface 15 and when the user lifts his/her foot from the brake pedal, the brake is led into its resting position 18 where the brake is activated. The sidewise-displacement of the cam follower 6 from the first rectilinear section of the cam track 14 into the following section positioned substantially perpendicularly to the first section is ensured by means of a spring 19 (see FIG. 1) secured in a recess 20 in the cam follower means. As clearly shown in FIG. 1, this displacement from the resting position 17 to the resting position 18 is performed by depression of one of the brake pedals 3. By a following depression of one of the brake pedals, the cam follower will be displaced upwardly due to the action of the spring 19, as shown in FIG. 4 and when the brake pedal is released the cam follower will continue its passage along the cam track 14 across the inclined surface 16 whereupon the cam follower 6 moves past the breast and downwards into the first section of the cam track and is returned to the first resting position where the brake is again deactivated. The cam track means 7 is fixed in relation to the support framework 1 by means of a tack which is integral with the protection plate and is mounted through an opening 21. The spring 19 is secured in the cam track means 7 using a tack 22 (see FIG. 1) mounted in an opening 23. To ensure that the cam follower 6 maintains correct engagement with the bottom of the cam track 14, a spring 24 is provided which is fixed in relation to the cam track means 7 using a tack which is integral with the protection plate and which is mounted in an opening 25.

Figure 5:
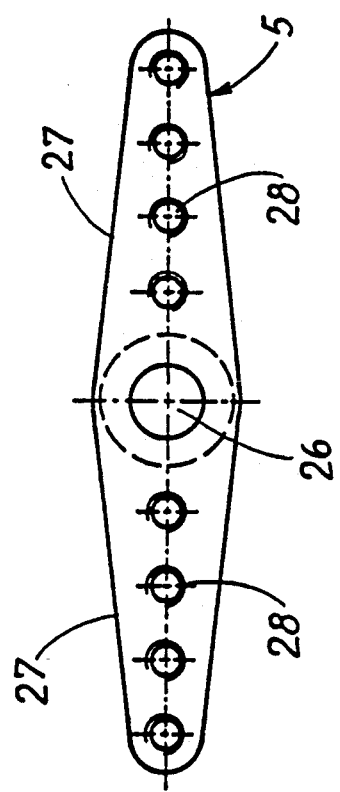
FIG. 5 illustrates a swinglebar connecting the brake lever to the cam follower.

FIG. 5 shows a plane view of a swinglebar intended for connecting the brake levers 4,4' to the cam follower 6. The swinglebar 5 is mounted pivotally about an axis 26. The two branches 27 of the swinglebar 5 are provided with several openings 28, in which the ends of the brake levers 4,4' and the cam follower 6, respectively, can be mounted. The choice of openings depends on the support framework length of the trolley. Thus it is possible to use the system in connection with support framework of trolleys 1 of varying lengths. It will also be possible to use the brake arrangement in connection with a very short trolley support framework (not shown) where a braking of the wheels is utilized at one end of the trolley only corresponding to the wheels 2 shown on the right hand side of FIG. 1.

Figure 7:
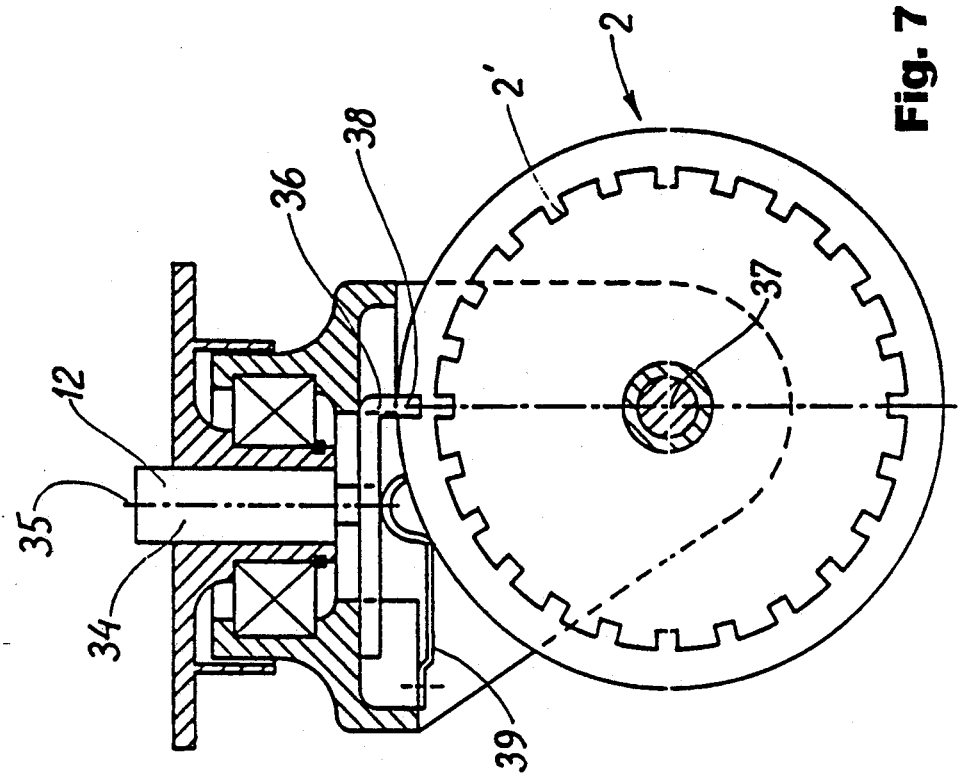
FIGS. 6 and 7 illustrate partial sections through pivotal wheels according to the invention.
Figure 6:
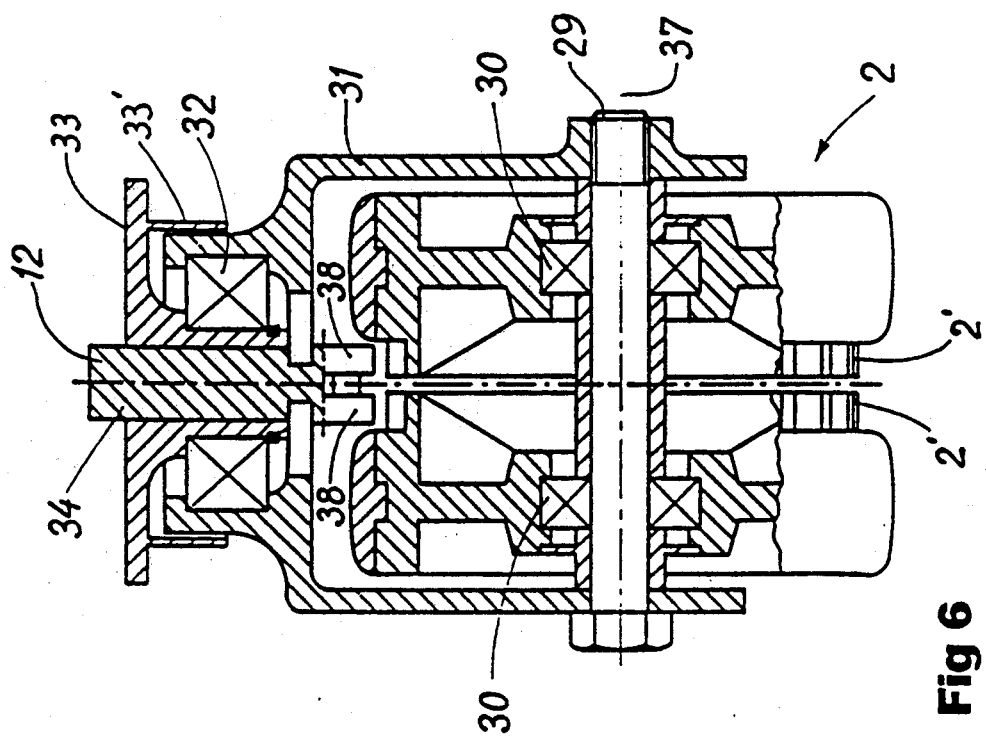
Figure 9:
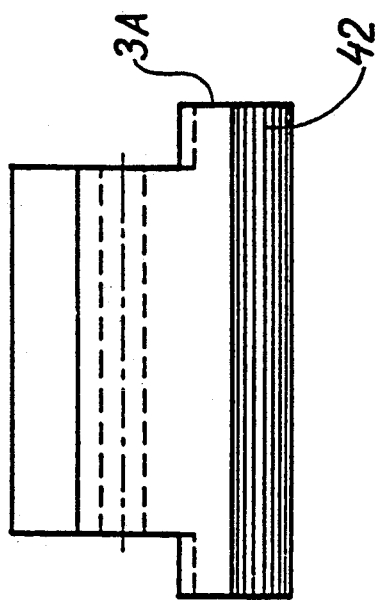
Figure 8:
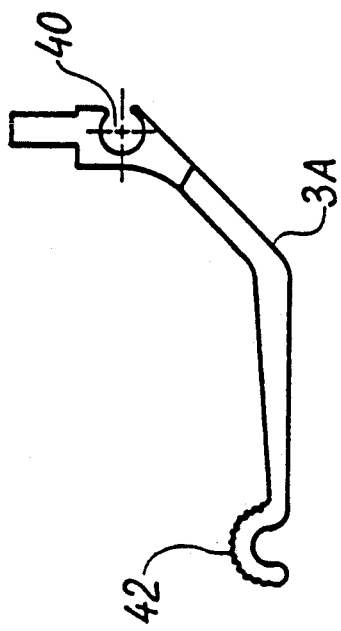

FIGS. 6 and 7 illustrate two partial sections through the pivotal twin wheels. The wheels are mounted about an axle-shaft bolt 29 through bearings 30. The axle-shaft bolt 29 is mounted in a pivotally supported fork bracket 31. By means of a bearing 32, the fork bracket 31 is mounted pivotally about an axis 35 in relation to a bracket 33 which is firmly connected to the support framework 1. The bearing 32 is cast into the fork bracket 31 in order to achieve maximum strength of the construction. By use of a sealed bearing a substantially maintenance free and closed construction is achieved.

FIGS. 6 and 7 also show the brake block 12. The brake block 12 is constituted by a cranked element of which a first cylindrical part 34 extends concentrically about the substantially vertical axis 35 about which the wheels are pivotally supported. The other part 36 of the cranked element extends in a substantially vertical plane passing through the rotation axis 37 of the wheels. As clearly illustrated in FIG. 7, the vertical axis 35 is offset in relation to a vertical plane comprising the axis of rotation 37 of the wheels which is necessary in order to obtain good functioning of the pivotal wheels 2. The other part 36 of the brake block is constituted by two resilient compliant tabs 38 intended for engagement with the teeth 2' on the twin wheels.

The brake block 12 is set into position by the lever arm 11 where the tabs 38 are brought into engagement with the teeth 2' to define the brake condition. A spring 39 ensures that the tabs 38 are brought out of engagement with the teeth 2' when the action of the lever arm 11 on the first part 34 of the brake block 12 stops. Hereby a condition without braking of the wheels is achieved. Thus, with the illustrated embodiment of the brake block it becomes possible to bring the tabs 38 safely into engagement with the teeth 2' through a translatory displacement of the brake block. However, it should be noted that the brake block may also be constructed with tabs extending from the first part 34 of the brake block if the wheels are not pivotal as the axis of rotation 37 of the wheels may then be situated directly under the axis 35 of the first cylindrical part 34.

Figure 12:
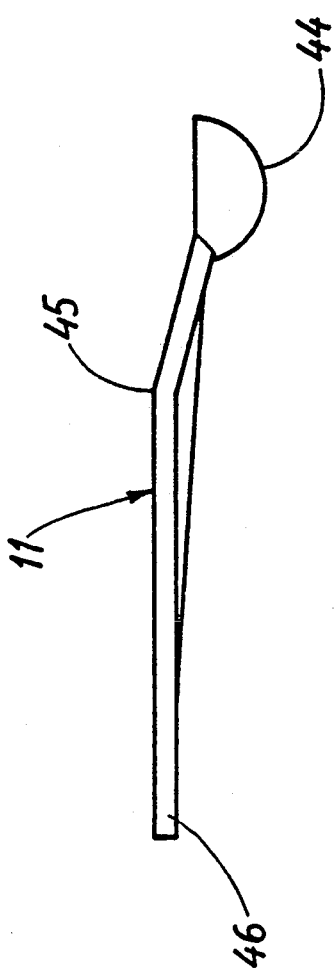
FIG. 12 is a view of a lever arm.

FIGS. 8-11 show that the brake pedal 3 is a two-component construction. Thus it comprises a first part 3A and a second part 3B. The part 3A is used only in a foot-operated brake pedal while the part 3B is always to be used. The part 3A comprises a recess 40 aligned with openings 41 in the part of 3B. Hereafter the two elements are connected by means of the shaft 9 mounted in the brackets 10 (not shown in FIG. 8-11). The part 3A comprises a corrugated portion 42 which the user depressed when activating or deactivating the brake. By this activation, the surface 43 of the part 3B will act on a substantially spherical portion 44 (see FIG. 12) of the lever arm 11. Thus the lever arm may be located in two different positions by tipping about an edge 45 which abuts the bottom of a recess 48 in which the lever arm 11 is positioned. In this one position the substantially spherical portion 44 will be moved upwards by the surface 43 and the other end 46 of the lever arm 11 will activate the brake block 12 in this position so as to be in the position where the tabs 38 are in engagement with the teeth 2'. In its other position, the other end 46 of the lever arm 11 will be moved upwardly due to the effect from the spring 39 and the tabs 38 are then brought out of engagement with the teeth 2' and due to the tipping about the edge 45 the spherical portion 44 is moved downwards. The other part 3B of the brake pedal is swung to its deactivated position due to the action of a tension spring 5'(see FIG. 1) which is mounted between a fixed position on the support framework and the swinglebar 5 and which pulls the swinglebar 5 which, via the brake levers 4,4', swings the other part 3B of the brake pedal to the deactivated position, whereby the spring 39 can displace the end 46 of the lever arm 11 upwards. The part 3B of the pedal is provided with an opening 47 to which the brake levers 4,4' can be attached in order to provide the interconnection between the brake pedals 3.

Each lever arm 11 is located as shown in FIG. 1 and, as mentioned above, in the recess 48 in the support framework 1. The recess 48 extends from a position overlapped by the brake pedal to a point in the immediate continuation of the vertical axis 35 passing through the cylindrical section 34 of the brake block 12. Thus the lever arms 11 are relatively simple to mount as they are simply placed loosely in their respective recesses 48 whereupon the brackets 33 are mounted on the support framework 1.

I claim:

1. A wheel and brake assembly for a vehicle having a front end and a rear end, said assembly comprising:
    a twin wheel device which can be pivotally mounted on one of said front end and said rear end of said vehicle, each wheel of said twin wheel device being independently rotatable and including a toothed rim,
    a brake block having tabs for engagement with said toothed rims of said wheels, said brake block being movable between a first position wherein said tabs are out of engagement with said toothed rims to allow rotation of said wheels and a second position in engagement with said toothed rims to prevent rotation of said wheels,
    a brake pedal means mounted to said one end of said vehicle, said brake pedal means including first and second parts, said second part being in one of a third position and a fourth position,
    a lever arm mounted between said brake pedal means and said brake block such that when said second part of said brake pedal means is in said third position, said brake block is in said first position, and when said brake pedal means is in said fourth position, said brake block is in said second position,
    a cam track means which defines an endless cam track that includes first and second rest portions separated by first and second inclined portions,
    a swinglebar rotatably mounted on said vehicle, a brake lever connected between said second part of said brake pedal means and a first end of said swinglebar, a cam follower which is located in said cam track means to follow said cam track, a first spring means to cause said follower to follow said cam track, and a second spring means connected to said swinglebar, said cam follower, by following said cam track from said first rest position to said second rest position and back to said first rest position, locks said second part of said brake pedal means in said third position or said fourth position, based on repeated applications of pressure onto said first part of said brake pedal means.

2. A wheel and brake assembly according to claim 1, wherein said cam follower defines first and second ends, said first end being pivotally connected to said swinglebar and said second end defining a finger which follows said cam track.

3. A wheel and brake assembly according to claim 2, wherein said twin wheel device includes a mounting bracket which is attachable to the vehicle to extend downwardly therefrom, said mounting bracket including a cylindrical collar; a fork bracket which includes an axle for mounting said twin wheels side-by-side, and a bearing means for rotatably mounting an upper end of said fork bracket on said mounting bracket within said cylindrical collar, thus providing a dust-proof connection.

4. A wheel and brake assembly according to claim 3, including a third spring in contact with said brake block to bias said brake block into said first position.

5. A wheel and brake assembly according to claim 4, wherein the twin wheels are mounted on said axle such that the toothed rims thereof are juxtaposed.

6. A wheel and brake assembly according to claim 5, wherein said brake block comprises a cranked element having first and second parts, wherein said first part extends through said mounting bracket to define a vertical axis which is offset from an imaginary vertical plane that extends through a second axis defined by said axle, and said second part extends downwardly in said imaginary plane to be engageable with the juxtaposed toothed rims of said twin wheels.

7. A wheel and brake assembly according to claim 4, wherein a first end of said lever arm which is in contact with said brake pedal means defines a spherical surface and a second end of said lever arm which is in engagement with said brake block defines a substantially plane surface.

8. A wheel and brake assembly according to claim 2, wherein said twin wheel device and said brake pedal means are located at said front end of said vehicle, wherein said first end of said cam follower is connected to said first end of said swinglebar, and including an additional brake lever connected to said second end of said swinglebar to extend to a brake pedal means mounted at said second end of said vehicle.

9. A wheel and brake assembly according to claim 2, including a fourth spring which overlies said cam track in said cam track means for maintaining said finger of said cam follower in contact with said cam track.

* * * * *